(12) United States Patent
Dorfman

(10) Patent No.: US 6,891,324 B2
(45) Date of Patent: May 10, 2005

(54) CARBON-METAL NANO-COMPOSITE MATERIALS FOR FIELD EMISSION CATHODES AND DEVICES

(75) Inventor: Benjamin F. Dorfman, San Francisco, CA (US)

(73) Assignee: Nanodynamics, Inc., Buffalo, NY (US)

( * ) Notice: Subject to any disclaimer, the term of this patent is extended or adjusted under 35 U.S.C. 154(b) by 107 days.

(21) Appl. No.: 10/179,376

(22) Filed: Jun. 26, 2002

(65) Prior Publication Data

US 2004/0000861 A1 Jan. 1, 2004

(51) Int. Cl.⁷ .............................. H01J 1/62; H01J 63/04
(52) U.S. Cl. .................. 313/495; 313/309; 313/346 R; 428/408; 428/698
(58) Field of Search ................................ 313/495, 309, 313/310, 311, 336, 346 R, 351; 428/408, 698, 212

(56) References Cited

U.S. PATENT DOCUMENTS

| | | | |
|---|---|---|---|
| 5,129,850 A | 7/1992 | Kane et al. | |
| 5,141,460 A | 8/1992 | Jaskie et al. | |
| 5,352,493 A | 10/1994 | Dorfman et al. | |
| 5,358,741 A | 10/1994 | Gat | |
| 5,463,271 A | 10/1995 | Geis et al. | |
| 5,466,431 A | 11/1995 | Dorfman et al. | |
| 5,534,743 A | 7/1996 | Jones et al. | |
| 5,564,959 A | 10/1996 | Spindt et al. | |
| 5,686,791 A | 11/1997 | Kumar et al. | |
| 5,726,524 A | 3/1998 | Debe | |
| 5,821,680 A | 10/1998 | Sullivan et al. | |
| 5,869,169 A | 2/1999 | Jones | |
| 5,872,422 A | 2/1999 | Xu et al. | |
| 6,080,470 A * | 6/2000 | Dorfman ..................... 428/216 |
| 6,100,628 A * | 8/2000 | Coll et al. ................... 313/310 |
| 6,250,984 B1 * | 6/2001 | Jin et al. ...................... 445/51 |
| 6,310,431 B1 * | 10/2001 | Blanchet-Fincher et al. .......................... 313/311 |

* cited by examiner

*Primary Examiner*—Joseph Williams
*Assistant Examiner*—Kevin Quarterman
(74) *Attorney, Agent, or Firm*—Brown Raysman Millstein Felder & Steiner LLP

(57) ABSTRACT

A field emission cathode consisting of atomic-scale composite material comprising three atomic networks is proposed. The first and the second atomic networks penetrate into each other and form carbon-based stabilized dielectric medium and the third atomic network is a conductive network of metallic atoms. The atomic scale composite material may also contain conductive nano-crystals immersed into the carbon-based stabilized dielectric medium. The atomic-scale conductive network and nano-crystals reach the film surface and film edge forming nanometer scale field emission sites. They may be partially exposed by etching the other components of the cathode material thereby forming atomic-scale and/or nano-scale field emission metallic tips.

The field emission cathode can be used as an efficient cold cathode in a variety of electronic devices, such as flat panel field emission displays, microwave diodes, triodes and more complex devices.

22 Claims, 10 Drawing Sheets

CARBON-METAL NANO-COMPOSITE MATERIALS FOR FIELD EMISSION CATHODES AND DEVICES

BACKGROUND OF THE INVENTION

1. Field of the Invention

The invention relates to electric field induced electron emitters and more particularly, to field emission cathodes and related micro-electronic devices and field-emission displays based on the use of carbon-metal diamond-like composites materials.

2. Background Art

The interest to advanced field emission (FE) cathode materials arises from a number of applications including field emitters for microelectronic devices, flat panel displays, high intensity electron beams for accelerators and free electron lasers, and high current density cathodes for microwave power tubes, klystrons and gyrotrons. As compared with more conventional thermionic electron sources, cold FE cathodes require no heater circuit and are capable of generating high current densities.

The most common approach in concentrating electric field to create the field induced electron emission is fabrication of metal tips using geometry dependent vapor deposition, commonly termed as the Spindt type cathodes. Two important limitations of micro-fabricated field emitter tips are their poor reliability and stability. In large part, these limitations can be traced to the inherent chemical/thermodynamic instability of clean, highly curved surfaces. Conventional fabrication processes, combined with the usual operating conditions inevitably lead to the build up of contaminants on emitter surfaces acting as barriers for electrons resulting in formation of a large effective work function. Another problem with the tip cathodes originates from a mechanical damage of the tips by positively charged ions, which reduces the cathode lifetime.

A significant break-through occurred recently in the development of diamond film cold cathodes. Diamond thin films (including amorphous films) have been found to yield significant current densities with quite low fields. Amorphous diamond thin films are capable of emitting electrons at the electric field of less than 20 V/m. A current density as high as 100 mA/mm2 was achieved. It is agreed, that this material when used in FE displays (FED), has the potential for surpassing all other materials in terms of brightness, contrast, response time and low power consumption. It has been noted that CVD diamond films have two important properties that are favorable to cold, low-field emission, namely, their negative electron affinity in some crystallographic directions and presence of graphite inclusions. These inclusions play an important role of conductive channels to localize applied electrical field. However, during cathode operation, graphite inclusions appear to act as nucleation sites to induce further conversion of diamond to graphite, which leads to material degradation. In addition, it is very difficult to attain uniform emission with minimum cathode series resistance, which is important for application of this technology to high luminance/large format displays. Comparative analysis of the forgoing materials is represented in the Table.

Recently, a new approach based on carbon nano-tubes has been applied to FED fabrication. The carbon filaments stemming from the carbon film represent good electric field concentrators yielding emission threshold as low as 1 V m. The drawbacks of this approach are that the technology is non-planar and cannot use the photolithography processing. The resultant control voltages are typically in the range of hundreds voltage, which makes difficult utilizing this technology for micro-devices.

Another direction of the field emission cathodes and Field Emission Displays relies on fabrication of the cathodes in the shape of edges of thin films. Such an approach has significant advantages over the tip-based technology. First, the cathode edge can be made within planar technology, which dramatically reduces the fabrication cost. Second, the edge is much more resistive to a mechanical damage. Finally, the edge length can be made extremely long for each cathode thereby providing a high emission current.

Typical design of the edge-emitter diode is shown in FIG. 1 (see A. Kastalsky, et al, SID-2001, p.201). The cathode edge plane is above the anode electrode. The latter is placed into the well etched in the substrate. Vertical distance between cathode and anode planes, which can be made less than a micron, is the active gap, controlling the emission process. In the cited work, a thin carbon film was utilized as the edge emitter used for realization of the FED, with phosphor layer deposited on the anode electrode. In application to the micro-devices, such a design is particularly attractive since the electrodes are shifted from each other laterally, thus minimizing the device capacitance. Deposition of the nano-composite cathode layer is expected to reduce the emission threshold voltage down to 1 V/m or lower.

From the afore said, it is clear that for the edge emission devices, availability of a thin, conductive, thermally, chemically and mechanically stable emissive film is of a paramount importance.

SUMMARY OF THE INVENTION

The presented invention is intended to utilize atomic scale composites as a field emission material to fabricate low threshold and efficient cathodes. Atomic scale composite (ASC) constitutes a new class of materials with unique mechanical, thermal, electrical, and other properties. Among other composite materials, ASC demonstrates a high resolution structures that make possible formation of conductive networks on an atomic and nanometer scale. ASC shows great ability to tailor specific requirements and combine features that seem contradictory within the frame of a classical solid-state physics and technology. These features are particularly important for vacuum micro-devices. Diamond-like ASC (DL ASC) represents a significant advance over "conventional" diamond-like carbon coatings (DLC), and demonstrates temperature stability much higher than that of DLC.

The proposed approach takes advantage of the tailorable properties of this unique coating, which consists of an amorphous diamond-like and quartz-like structure "doped" with controlled quantities of metals (Me-DL ASC). Me-DL ASC appears as a new composition of matter that allows formation of special composites at atomic level with properties that range from highly conductive to purely dielectric. Metal components imbedded in the host matrix in an appropriate way create three-dimensional random conductive structures spreading in the film as metal fibers. The fibers can be made very thin, in the range of one to a few nm. When exposed to the vacuum, they can serve as multiple, extremely efficient electron emission sites. Since the emitter surface curvature essentially controls the emission efficiency, one can expect very low emission threshold voltage from the metal network, significantly lower than that in traditiona, Spindt, metal tip cathodes. In addition, as this material belongs to the diamond-like family, DL ASC has a potential to posses low work function or even negative electron affinity. Finally, this material can be formed as a highly stable super-lattice containing alternating DL ASC and Me-DL ASC layers with the minimum thickness being about 2 nm.

DL ASC also exhibits high chemical, mechanical, thermal and radiation stability, together with excellent adhesion to a wide variety of substrates with minimal interface thickiess and intrinsic stress, which warrant long lifetime for field emission cathodes and devices.

In consideration of the forgoing, an object of the present invention is the field emission material with multiple emission sites, high field enhancement factor, potentially low work function and appears as highly adherent, thermally, chemically and mechanically stable material.

Another object of the present invention is the edge-emission Me-DL ASC cathodes to achieve uniform, low voltage, large area emission.

Another object of the present invention is application of edge-emission cathodes to vacuum micro-devices.

Still another object of the present invention is to apply ASC cathodes for fabrication of the field-emission flat panel displays.

The forgoing objects can be achieved, according to the present invention, by fabrication of a new field emission film, namely, film of functionally graded ASC comprising three networks: the first basic network consists of a material capable of, low voltage emission; the second is stabilizing dielectric network, and the third is electrical conductive network of metallic matrix of metallic phase nano-crystals immersed into the dielectric medium.

In one embodiment of the field emission cathodes of the present invention, said functionally graded material is deposited on a flat surface, and the edge of the film serves as a source of emission. The emission sites are multiple metal fibers reaching the film edge. Selective chemical etching of the other film components at the edge will be helpful in providing clean metal fibers exposed to the vacuum. Since the fiber dimensions are on the nano-meter scale, one can expect extremely efficient electron emission at a very low threshold voltage. The anode electrode is placed below and next to the cathode electrode, so that the distance between the cathode and anode planes essentially controls the cathode-anode active gap. This two-terminal structure serves as a microwave diode.

In another embodiment, the phosphor layer is placed on the anode electrode to produce light under electron bombardment, thus forming the FED pixel.

In the third embodiment, third electrode, collector, is placed coplanar with the anode electrode and shifted further away from the cathode to form a triode structure. The anode electrode serves here both as an electron extractor and a gate to control current to the collector.

In the fourth embodiment, the collector electrode is made coplanar with the cathode, so the anode/gate electrode is placed in the well between the cathode and the collector.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE INVENTION

FIG. 2 is an example of diagrams of atomic-scale composites structure and structures (Prior Art). The fundamental structure of the atomic-scale composites to be implemented as the field emission cathodes is comprised of two interpenetrating random networks. The first basic network consists of material capable of a low voltage emission, while the second is stabilizing dielectric network. An example of such structures are DL ASC, that belong to the diamond-like family of materials. There two major class of DL ASC. The first class of DL ASC consists of a random carbon network, mainly in the form of sp3 "diamond-like" bonds chemically stabilized by hydrogen atoms, and a quartz-like silica random network, e.g. silicon network chemically stabilized by oxygen atoms. These interpenetrated networks form together a purely amorphous structure (FIG. 2, a). Such two-network DL ASC does not contain any clusters or ordering greater than that defined by one third of the radius of the coordination sphere. This structure has been confirmed by an electron projection method, scanning tunneling microscopy, atomic force microscopy, glancing x-ray and electron diffraction techniques, and high resolution TEM. Cluster formation is prevented in the sources in the primary plasma, in the chamber space and during film growth.

The second class of DL ASC comprises sp2-bonded graphite-like layer structure and sp3-bonded three-dimensional diamond-like structure, wherein said graphite-like layered structure is penetrated and bonded together by said diamond-like structure, the entire structure of said carbon-based dielectric medium is stabilized by silicon and oxygen. This results with predominantly amorphous structure possessing a slight one-axis anisotropy, e.g. quasiamorphous (FIG. 2, b).

Both the above discussed atomic-scale random structures serves as an ideal matrix for the introduction of additional impurities, especially metals, to form a nano-disperse film of Me-DLASC, FIG. 2, c. These additional components can be distributed in the host random matrix as separated atoms (for example metals at low concentration), as a third random network (e.g., metals at concentration 10–45 atomic %), or as nano-crystals immersed into the host matrix. The three networks (the carbon matrix, a-Si, and a-Me) are bonded to each other mainly by weak chemical forces, while some strong inter-network chemical bonds provide the entire composite structure with mechanical strength and thermal stability. It should be pointed out that carbide formation could be prevented even at metal concentrations as high as 50% (verified using Auger electron spectroscopy, ESCA, EXAFS, and IR spectroscopy).

Figure 1:
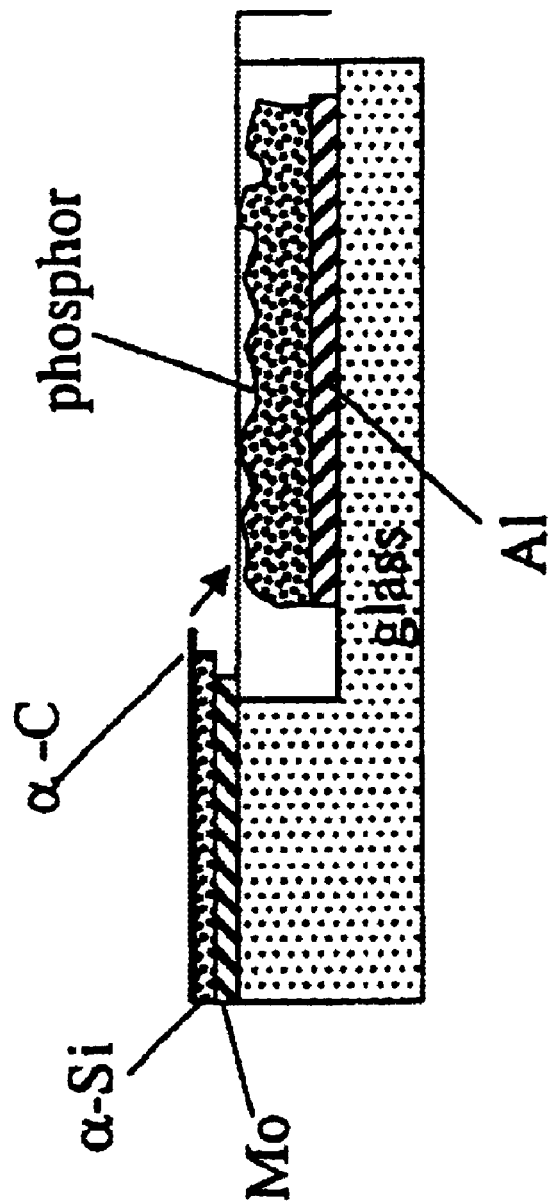
FIG. 1 (Prior Art) shows an example of the design of cathode-anode edge field emission structure.
Figure 2A:
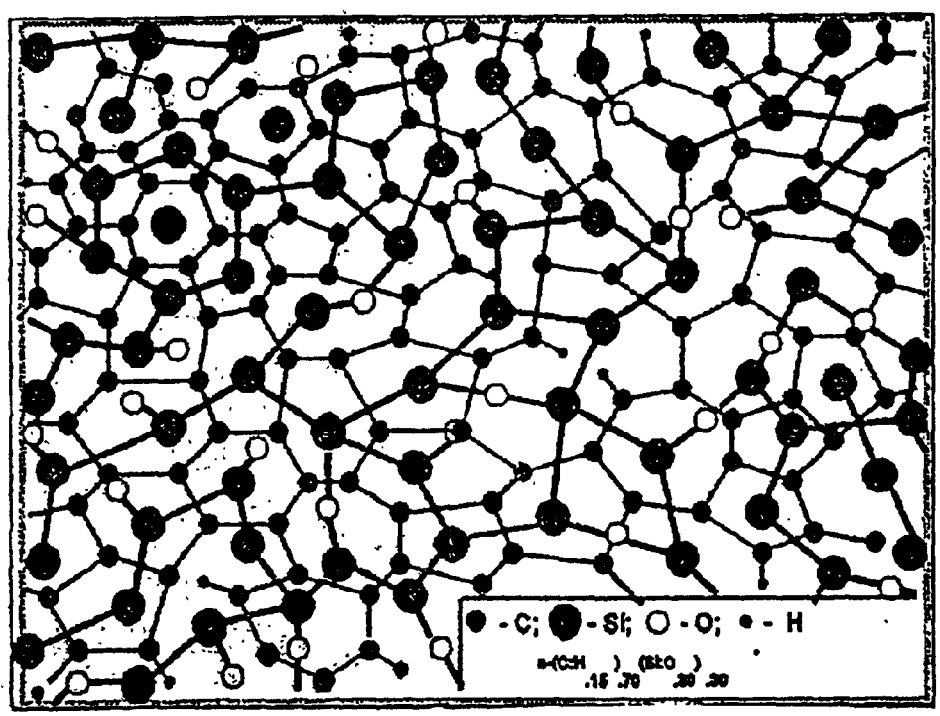
FIG. 2a (Prior art) is an example of a Diamondlike-Quartzlike two-network dielectric medium.
Figure 2C:
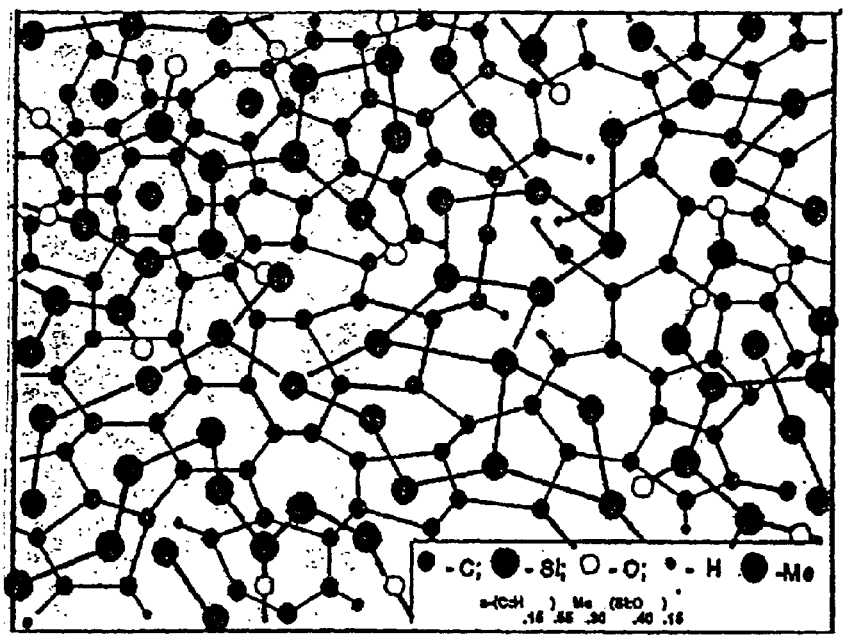
FIG. 2c (Prior art) is an example of a Diamondlike-quartzlike-metal three-network metal dielectric composite of atomic scale.
Figure 2B:
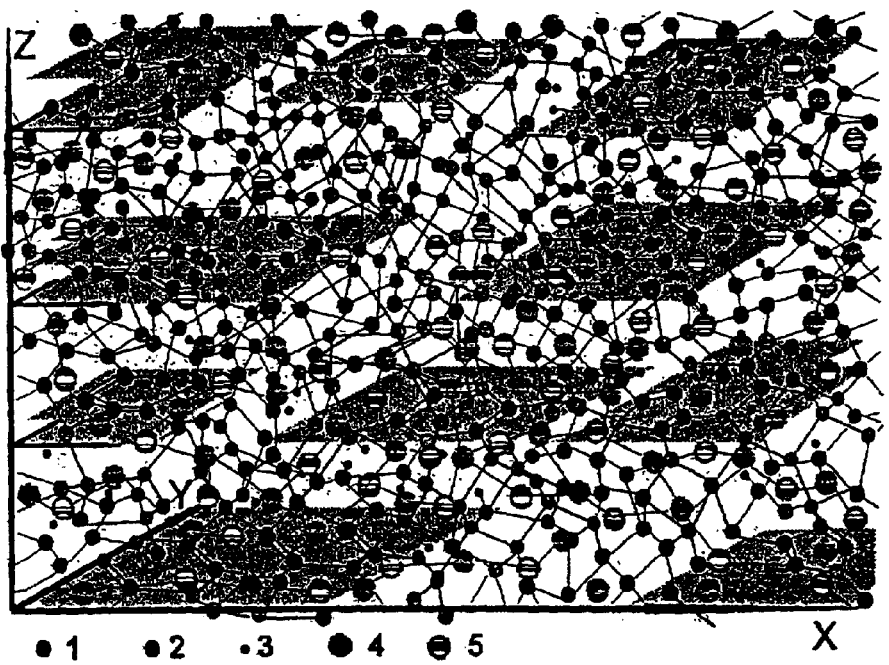
FIG. 2b (Prior art) is a an example of a Graphitelike-Diamondlike two-network dielectric medium.
Figure 2D:
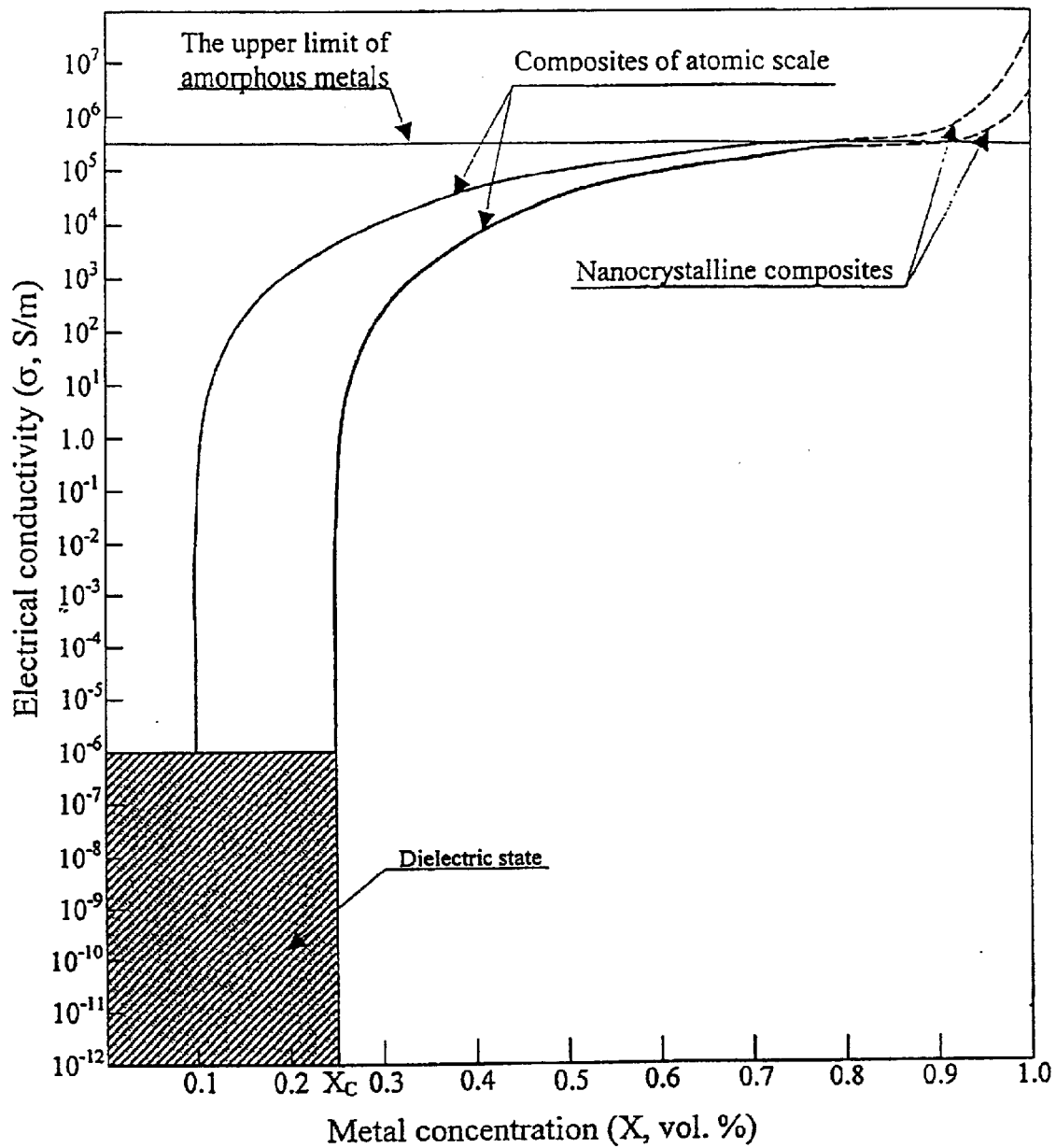
FIG. 2d (Prior art) is the range of controllable electrical conductivity and conductivity percolation transition in Me-DL ASC.

The above described atomic-scale self-stabilized amorphous composites form media in which unique combinations of electrical properties are obtained. In these systems, all the main electron transport mechanisms of dielectric, metal, and intermediate electron percolation phenomena can be achieved. The electrical conductivity of three-network Me-Carbon diamond-like composites of atomic scale at room temperature can be varied over 18 orders of magnitude (between about ~$10^{14}$ ohm-cm and ~$10^{-4}$ ohm-cm) by controlling the metal concentration. Conductivity percolation transition from dielectric state to metallic conductor state depends on diameters of the "doping" metallic elements (FIG. 2d). In Me-DL ASC with metals possessing small atomic diameters (Cr, Fe, Ni, Co) the transition occurs at metal concentration of 25 volume %. In Me-DLASC with metals possessing large atomic diameters (W, Nb, Hf) the transition threshold corresponds to metal concentration of 25 volume %. The intermediate values of threshold suitable for specific applications, such as field emission cathodes, may be achieved by combination of different metal in a uniform Me-DLASC structure.

FIG. 3 is properties and images of real metal-dielectric composites of atomic scale.

Figure 3A:
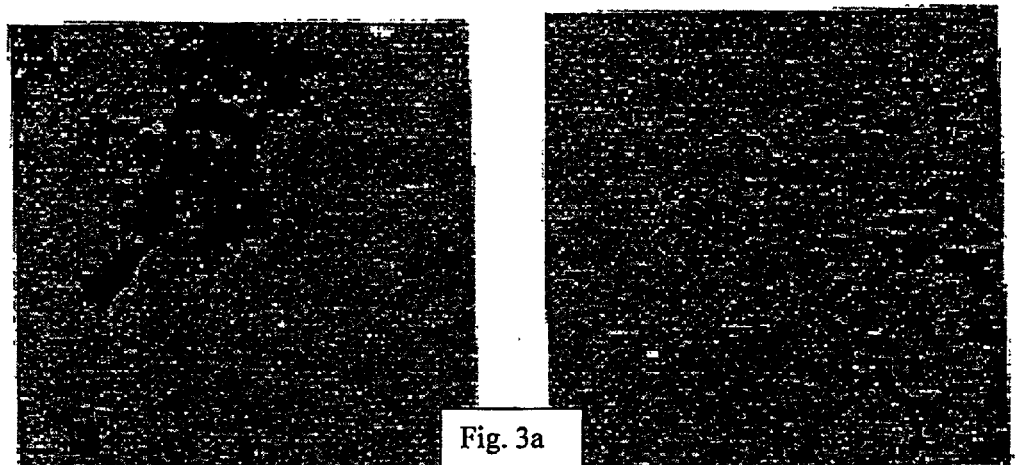
FIG. 3a is a near post-percolation range of metal content; a nearly uniform conductivity.
Figure 3B:
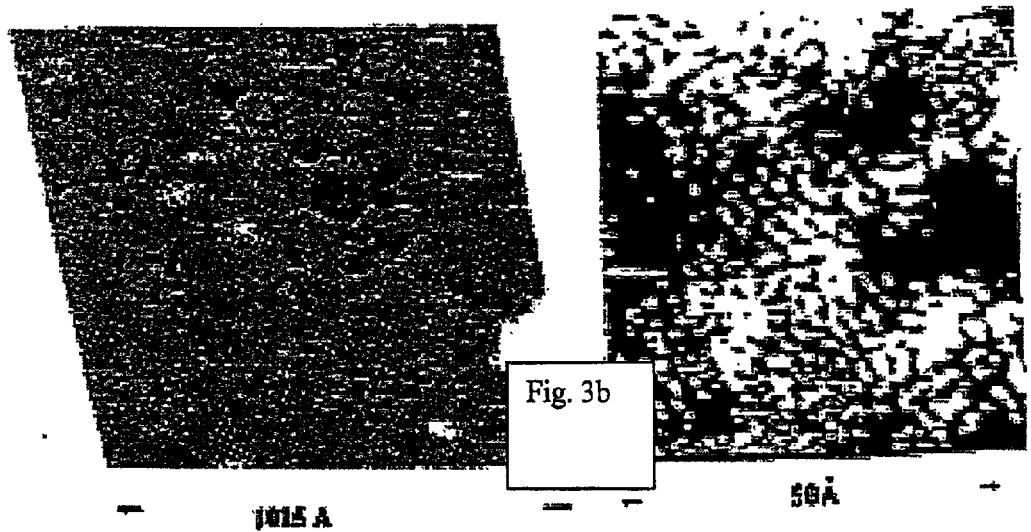
FIG. 3b is a far post-percolation range; thin film comprises Pt nano-crystals imbedded into the diamond-like medium. The atomic-resolution of region with enhanced conductivity (right) show ordered structure.

FIGS. 3a, b, c is a STM images of Pt-DL ASC composite films. Dark areas correspond to dielectric medium, bright white areas-metallic network sites.

Figure 3C:
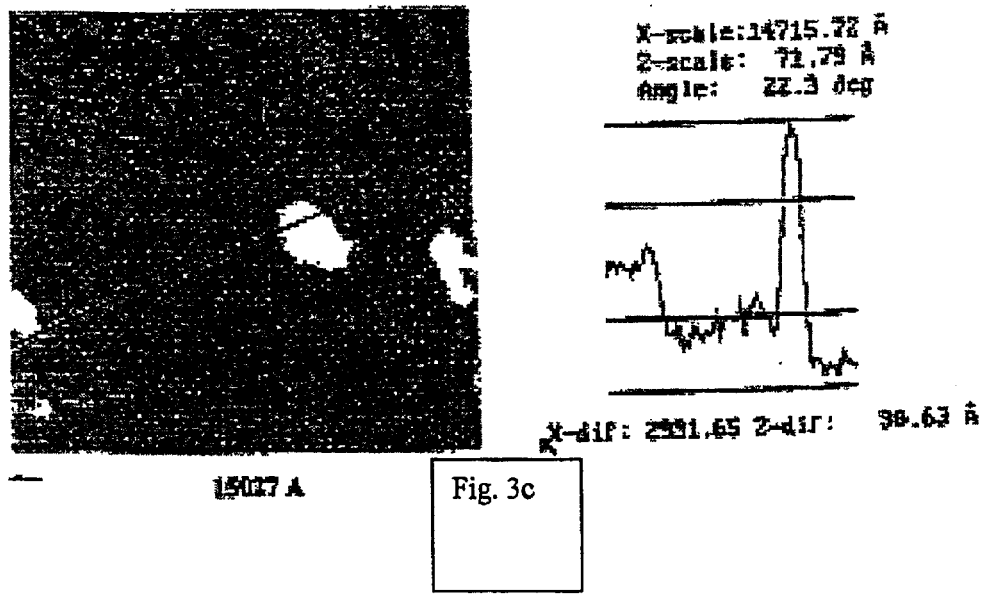
FIG. 3c is a vicinity of percolation transition of metal content; STM image shows bright rare metallic sites (density ~108 cm-2); STM profile (right) shows an atomic-scale sharpness of the tips.
Figure 3D:
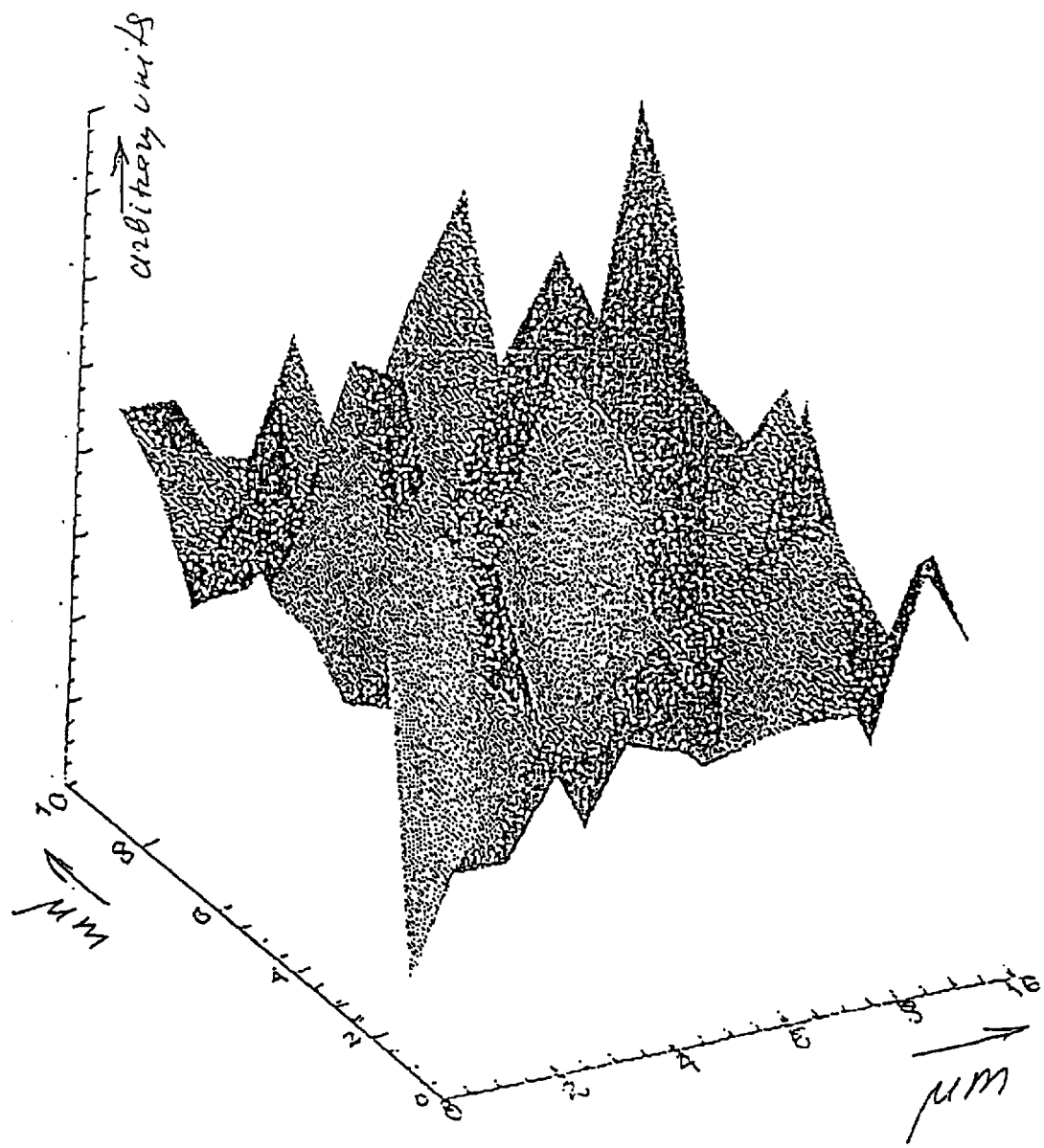
FIG. 3d is a synchrotron-based x-ray micro-tomography of the nano-scale tungsten tips over upon the surface of three-network {W/C} composite. The scale in normal direction is in arbitrary units, the scales in plane are given in micrometers. The spatial resolution of this tomography is not enough to resolve the tips' curvature radiuses. Based on STM, they are of an atomic scale.

Spatial distribution of metal chains inside the material is dependent on metal concentration, deposition temperature, as well as the ratio between deposition rates of the basic species and the metal. Some typical STM images obtained on Pt-Carbon composite thin films deposited and treated under various conditions are shown in FIGS. 3a,b,c (brighter regions represent sites on the surface with higher conductivity). In particular, FIG. 3c shows platinum nano-crystal immersed in diamond-like matrix that forms an atomic-scale sharp tip. FIG. 3d shows synchrotron x-ray micro-tomography of the tungsten nano-tips upon the external surface of W-Carbon films; these tips aren't crystalline; they are formed by atomic-scale tungsten "fibers".

By altering the Me-network spatial distribution, a non-uniform conductive structure with dot-like conductive areas on the surface, i.e. potentially emitting sites, with densities from $10^6$~$10^{13}$ cm2, can be formed. The structure of these composites can be tailored at the molecular level to combine unique electrical, emissive and other desirable solid-state properties with mechanical strength, hardness, and chemical resistance.

DL ASC films show excellent adhesion (tested by tape pull, high-frequency ultrasound measurements, and precise micro-indentation of Vickers diamond pyramid into the DL ASC/substrate interface) on various metals and semiconductors and possess high micro-hardness (from 12 to 55 GPA in the case of pure diamond-like matrix, and from 7 to 25 GPa in the case of carbon metal composite structures) combined with low stress, high elasticity and flexibility. Flexibility remains very high due to their fundamental atomic-scale composite network structure and low density of diamond-like matrix that is in the range of 0.35 to 0.65 with regard to the dense crystalline carbon phase, e.g. diamond (the matrix does not contain any pores, but its tracery structure comprises vacancies of atomic size with diameters up to about 0.3 nm).

Although stability is commonly the central problem of the amorphous state of matter, the DL ASC structures exhibit unusual stability under adverse conditions. At temperatures below 550 K, the lifetime of DL ASC is not limited in any practical sense. DL ASC form mechanically stable protective coatings chemically unaffected by most organic and inorganic agents even at thickness of 15 to 20 nm. Prolonged exposure to severe aqueous environments, 2 hours at 1523 K in anhydrous HC1 flow, over 400 hours in 10% hydrochloric acid, and corrosion tests with various other inorganic and organic liquid agents including HC1, I-1N03, HF, inorganic acids, organic acids, aqueous solutions of NaC1, KC1, CuN03, CUS04, and other salts have shown that these films are extremely impermeable and can serve as extremely stable media barrier coatings.

It is well known that under ion or electron irradiation, as well as thermal annealing, graphitization of diamond and DLC films occurs. In our recent measurements, (see B. F. Dorfinan in Handbook of Surfaces and Interfaces of Materials, Academic Press, 2001, v. 1, Chapter 8, pp. 468–470) Pd-Carbon DLASC films under ion bombardment have shown increase in sp3/sp2 ratio, i.e. shift toward the diamond state. In preliminary glow discharge argon plasma etching tests, DL ASC was found to exhibit a much lower etching rate than DLC. No structural degradation was observed below the threshold. Thus, DL ASC represents the most stable class of amorphous materials.

Extremely high potential of DL ASC to improve stability and to increase emission current of the field emitters was confirmed experimentally (see B. F. Dorfman in Handbook of Surfaces and Interfaces of Materials, Academic Press, 2001, v. 1, Chapter 8, pp. 492). DL ASC was employed to stabilize emission from a sharp hafnium carbide tip. The thickness of deposited DL ASC was approximately 10 nm. The DL ASC tip coating resulted in enhanced stability and increased lifetime as much as 8–10 times that of the uncoated tip. At the same time, the emission current was not changed markedly. This result is consistent with the enhancement of sp3/sp2 ratio for DL ASC compared to amorphous diamond coatings. This enhanced ratio provides extremely high material stability. Increase of the emission current in 3–4 times at constant applied fields was observed when the tip was coated by Hf-Df ASC. This phenomenon is attributed to formation of a non-uniform conductive structure that increases the field enhancement factor of the cathod surface.

By altering the Me-network spatial distribution, a non-uniform conductive structure kith dot-like conductive areas on the surface, i.e. potentially emitting sites, with densities from 10_10" CMZ, can he formed. The structure of these composites can be tailored at the molecular level to combine unique electrical, emissive and other desirable solid-state properties with mechanical strength, hardness, and chemical resistance.

DL ASC films show excellent adhesion (tested by tape pull, high-frequency ultrasound measurements, and precise micro-indentation of Vickers diamond pyramid into the DL ASC/substrate interface) on various metals and semiconductors and possess high micro-hardness (from 12 to 55 GPA in the case of pure diamond-like matrix, and from 7 to 25 GPa in the case of carbon metal composite structures) combined with low stress, high elasticity and flexibility. Flexibility remains very high due to their fundamental atomic-scale composite network structure and low density of diamond-like matrix that is in the range of 0.35 to 0.65 with regard to the dense crystalline carbon phase, e.g. diamond (the matrix does not contain any pores, but its tracery structure comprises vacancies of atomic size with diameters up to about 0.3 nm).

Although stability is commonly the central problem of the amorphous state of matter, the DL ASC structures exhibit unusual stability under adverse conditions. At temperatures below 550 K, the lifetime of DL ASC is not limited in any practical sense. DL ASC form mechanically stable protective coatings chemically unaffected by most organic and inorganic agents even at thickness of 15 to 20 nm. Prolonged exposure to severe aqueous environments, 2 hours at 1523 K in anhydrous HC1 flow, over 400 hours in 10% hydrochloric acid, and corrosion tests with various other inorganic and organic liquid agents including HC1, I-1N03, HF, inorganic acids, organic acids, aqueous solutions of NaC1, KC1, CuN03, CuS04, and other salts have shown that these films are extremely impermeable and can serve as extremely stable media barrier coatings.

It is well known that under ion or electron irradiation, as well as thermal annealing, graphitization of diamond and DLC films occurs. In our recent measurements, (see B. F. Dorfman in Handbook of Surfaces and Interfaces of Materials, Academic Press, 2001, v. 1, Chapter 8, pp. 468–470) Pd-Carbon DLASC films under ion bombardment have shown increase in sp3/sp2 ratio, i.e. shift toward the diamond state. In preliminary glow discharge argon plasma etching tests, DL ASC was found to exhibit a much lower etching rate than DLC. No structural degradation was observed below the threshold. Thus, DL ASC represents the most stable class of amorphous materials.

Extremely high potential of DL ASC to improve stability and to increase emission current of the field emitters was confirmed experimentally (see B. F. Dorfman in Handbook of Surfaces and Interfaces of Materials, Academic Press, 2001, v. 1, Chapter 8, pp. 492). DL ASC was employed to stabilize emission from a sharp hafnium carbide tip. The thickness of deposited DL ASC was approximately 10 nm. The DL ASC tip coating resulted in enhanced stability and increased lifetime as much as 8–10 times that of the uncoated tip. At the same time, the emission current was not changed markedly. This result is consistent with the enhancement of sp3/sp2 ratio for DL ASC compared to amorphous diamond coatings. This enhanced ratio provides extremely high material stability. Increase of the emission current in 3–4 times at constant applied fields was observed when the tip was coated by Hf-DL ASC. This phenomenon is attributed to formation of a non-uniform conductive structure that increases the field enhancement factor of the cathode surface.

The said nano-composite material and related cathodes can be formed by remote plasma enhanced CVD with DC or RF accelerating electrical field applied to the substrate and by metal sputtering or evaporation which is followed (or may not) by annealing of as deposited films.

Figure 4:
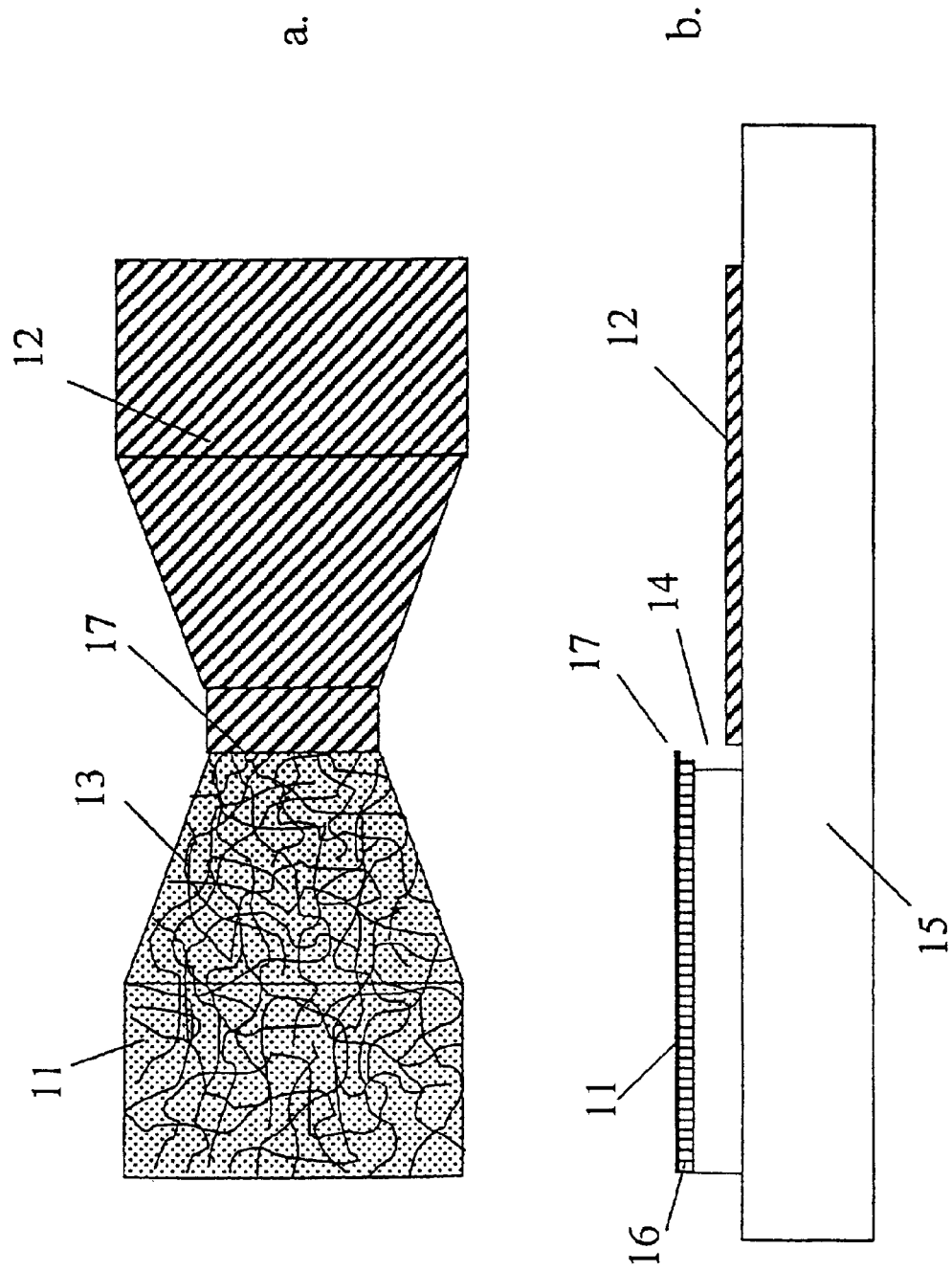
FIG. 4a is a top view of the diode electrode structure, with the nano-composite film as a cathode.
FIG. 4b is a cross sectional view of the diode electrode structure, with the nano-composite film as a cathode.

FIG. 4 illustrates the two-terminal cathode-anode structure of the microwave diode according to the present invention. The top view in FIG.;. 4a shows contacts in a butterfly shape that is needed for high frequency operation. The cathode electrode 11 consists of multiple metal fibers 13 extending to the edge 17 of the film. The cross-sectional view in FIG. 4b shows the cathode-anode gap 14 etched in the glass substrate 15, and the anode electrode 12 placed in the etched area using standard self-aligned metal deposition technique to minimize the cathode-anode spacing. It also shows the metal layer 16 underneath the Me-DL ASC film to provide good contact to the edge 17.

In another embodiment, FIG. 4c, instead of glass etching, the insulator layer 18 is grown first on the substrate, and the insulator film is then etched in the anode area prior to self-aligned anode metal deposition. This is another way to place the anode below the cathode plane.

In another embodiment, not shown, the edge of the cathode film is etched to remove carbon and SiOx components of the Me-DL ASC film and leave the metal fibers exposed.

Figure 5:
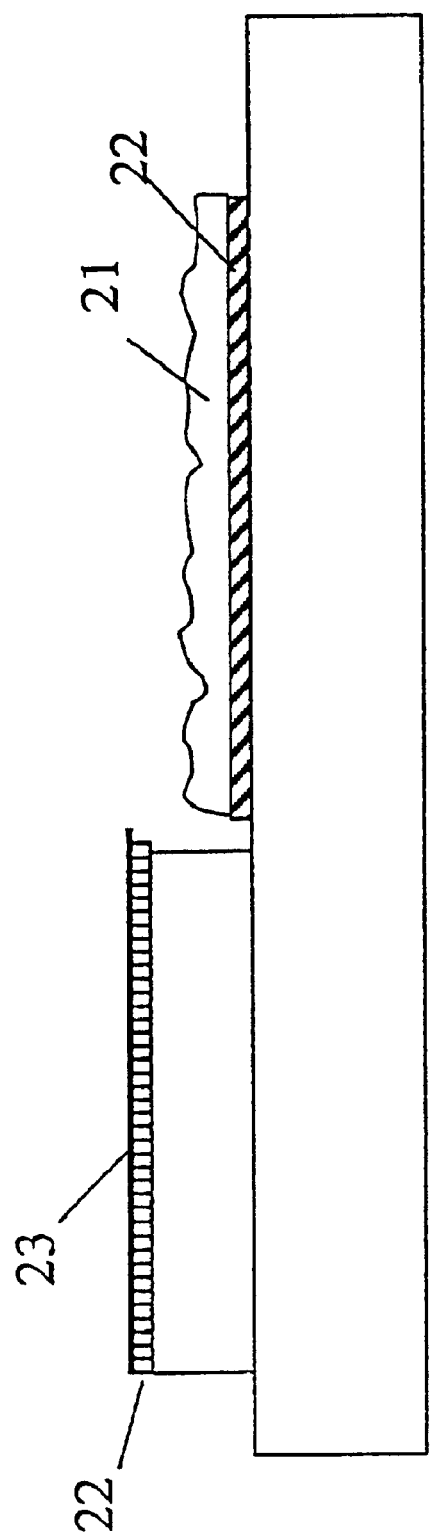
FIG. 5 is a cross-sectional view of the diode structure with the phosphor layer on the anode electrode and the nano-composite film as the cathode.

FIG. 5 shows the diode structure with the phosphor 21 placed on the anode electrode 22. This embodiment designed for the FED application. As before, the nano-composite film 23 serves as the cathode film, and the anode electrode 22 is located below the cathode plane, deep enough to accommodate both the anode electrode and the phosphor layer 21.

Figure 6:
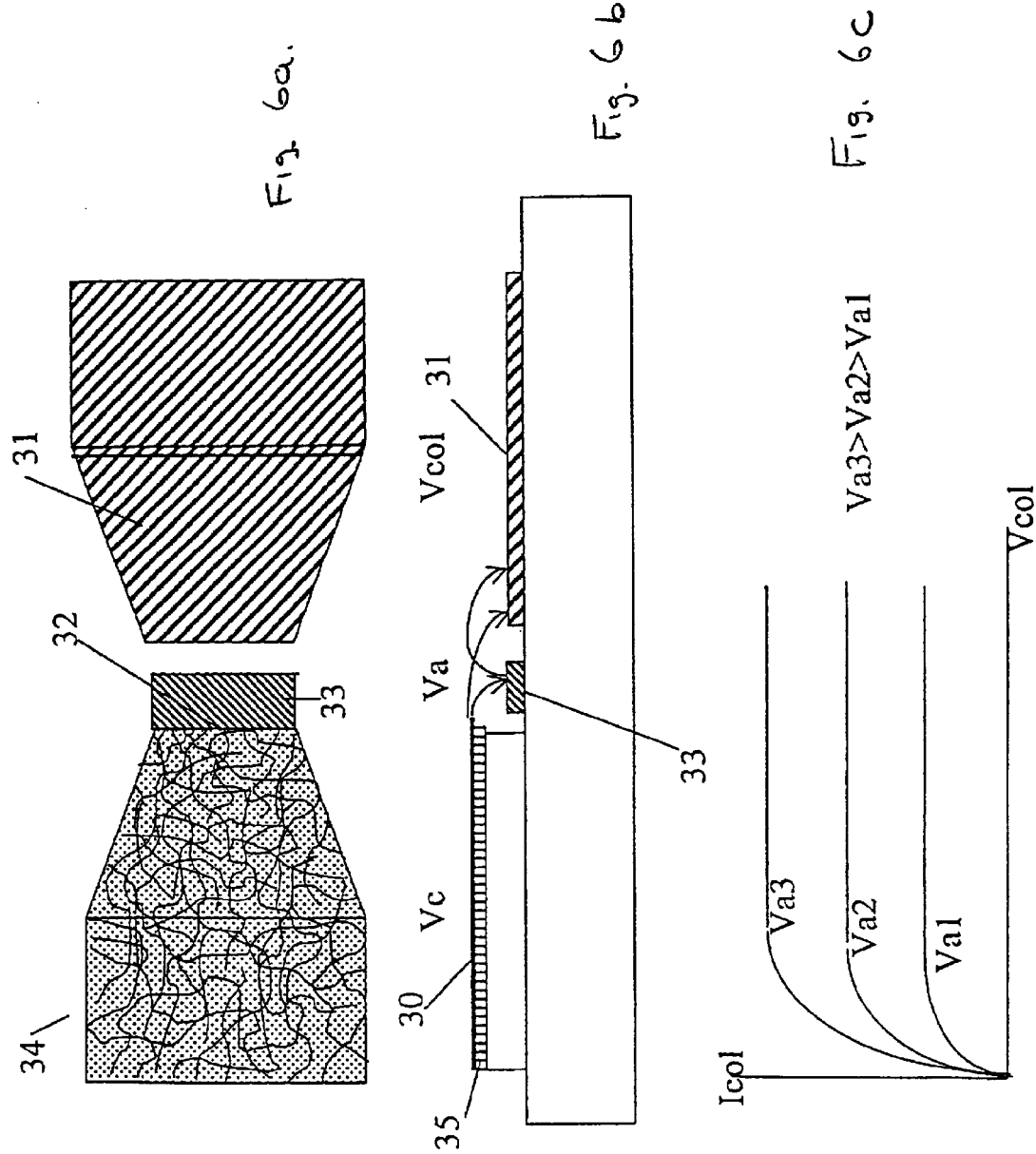
FIG. 6a is a top view of the triode electrode structure, with the nano-composite film as a cathode.
FIG. 6b is a cross section view of the triode electrode structure, with the nano-composite film as a cathode.
FIG. 6c is the expected IV characteristics of the triode

FIG. 6 shows the triode structure, according to the present invention. The top view in FIG. 6a shows close cathode-anode distance 32 made by using the self-aligned metal deposition technology and a relatively distant collector electrode 31. The nano-composite material 30 is placed on the cathode 34. In such a design, the anode/gate electrode controls the electron emission, while the collector electrode 31 serves only for collection of emitted electrons and does not affect the emission. FIG. 6b shows the cross-sectional view of the triode structure. In this embodiment, the collector electrode 31 is placed below the cathode plane and coplanar with the anode electrode 33. To maintain low cathode electrode resistance, metal film 35 is placed underneath the cathode nano-composite film 30.

The anode-to-cathode potential difference, Va–Vc, is much less than the collector-to-cathode one, Vcol–Vc, so the power gain Pc/Pa=Ic(Vcol–Vc)/Ia(Va–Vc) is expected to be high if the collector current is comparable to the anode current. Taking into account effects of electron reflections and secondary emission from the anode, one can expect the collector current to be a significant fraction of the anode current, especially at low anode voltages. At high collector voltages and a fixed Va, the majority of emitted electrons will reach the collector providing the saturation of the Icol–Vcol characteristics as shown in FIG. 6c. The saturation level in this case is controlled by the anode voltage Va, thus providing a family of the output transistor characteristics, similar to that in the semiconductor Field Effect Transistor.

Figure 7:
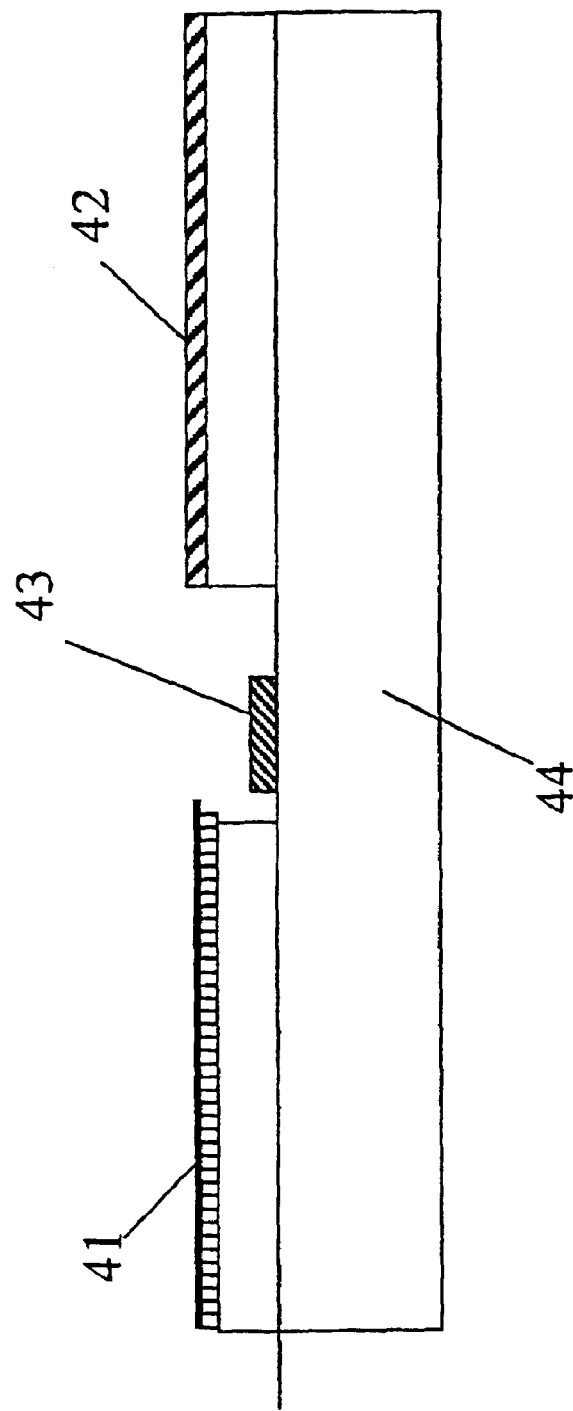
FIG. 7a is a top view of the triode wherein the cathode and collector are coplanar.
FIG. 7b is a cross-sectional view of the triode wherein the cathode and collector are coplanar.

FIG. 7 shows another version of the triode structure, in which the cathode 41 and the collector 42 are coplanar, while the anode/rate electrode 43 is placed in the well etched in the glass substrate 44. Similar triode structure, not shown, can be achieved when the insulation layer is first deposited on the substrate and then this layer is etched in the area of the anode/gate electrode 43 before the metal deposition into this well.

The present invention, therefore, is well adopted to carry out the objects and attain the ends and advantages mentioned. While preferred embodiments of the present invention have been described for the purpose of disclosure, numerous other changes in the details of the material structure, composition, graded functionality and device designs can be carried out without departing from the spirit of the present invention which is intended to be limited only by the scope of the appended claims.

What is claimed is:

1. A cathode comprising an atomic-scale composite material comprising a first and a second atomic networks that penetrate into each other to form a carbon-based stabilized dielectric medium, and a third atomic network of metallic atoms spatially disposed within dielectric medium to form a conductive network of metallic atoms that communicate with a cathode surface through the dielectric medium to form at least one nanometer scale emission site.

2. The cathode of claim 1, wherein said first atomic network of said carbon-based stabilized dielectric medium is a diamond-like carbon network, and said second dielectric network is a quarts-like silica network.

3. The cathode of claim 1, wherein said carbon-based stabilized dielectric medium comprises an sp2-bonded graphite-like layered structure and an sp3-bonded three-dimensional diamond-like structure, wherein said graphite-like layered structure is penetrated and bonded together by said diamond-like structure, and wherein said carbon-based dielectric medium is stabilized by silicon and oxygen.

4. The cathode claim 1 wherein said atomic scale composite material comprises conductive nano-crystals immersed into said carbon-based stabilized dielectric medium.

5. The cathode claim 1 wherein said conductive network of metallic atoms is functionally graded in said dielectric medium.

6. The cathode of claim 1 wherein said cathode surface comprises a film edge and wherein said conductive network of metallic atoms communicates with the film edge to form at least one nanometer scale emission sites.

7. The electron emitter of claim 4 wherein said cathode surface comprises a film edge, and wherein said conductive network of metallic atoms and said nano-crystals communicate with at least one of the surface and the film edge to form at least one nanometer scale emission sites.

8. The cathode of claim 6 wherein said cathode comprises a film surface and wherein the at least one emission site is formed by selectively removing from about 1 nm to 100 nm of said carbon-based dielectric medium from the film surface to cause said conductive network of metallic atoms to becomes at least partially exposed and forms atomic-scale emission metallic tips.

9. The cathode of claim 6 wherein said cathode comprises a film surface and wherein the at least one emission site is formed by selectively removing from about 2 nm to 100 nm of said carbon-based dielectric medium from the film surface to cause said metallic nano-crystals to become at least partially exposed and form nano-scale emission tips.

10. The cathode of claim 1 wherein said atomic-scale nano-composite material comprises said conductive network immersed into said carbon-based stabilized dielectric medium, and wherein said conductive network is functionally graded in the dielectric medium and comprises at least one element selected from a group that consists of: Ag, Cu, Au, Ti, Zr, Hf, V, Nb, Ta, Cr, Mo, W, Re, Fe, Co, Ni, Pd, Rh, Ru, Os, Ir, and Pt.

11. The cathode of claim 1 wherein said conductive network and said nano-crystals are functionally graded in the dielectric medium, and said conductive network comprises at least one element selected from a group that consists of: Ag, Cu, Au, Ti, Zr, Hf, V, Nb, Ta, Cr, Mo, W, Re, Fe, Co, Ni, Pd, Rh, Ru, Os, Ir and Pt.

12. The cathode of claim 4 wherein said atomic-scale nano-composite material comprises said electrical conductive network and nano-crystals immersed in the dielectric medium, the conductive network and nano-crystals are functionally graded in the dielectric medium, and said conductive network comprises at least one element selected from a group that consists of: Ag, Cu, Au, Ti, Zr, Hf, V, Nb, Ta, Cr, Mo, W, Re, Fe, Co, Ni, Pd, Rh, Ru, Os, Ir, and Pt.

13. The cathode of claim 4 wherein said atomic-scale nano-composite material comprises said conductive network and nano-crystals which are functionally graded in the dielectric medium, said conductive network and nano-crystals comprise at least one of: $RuO_2$, a carbides, a nitrides, and a borides.

14. The cathode of claim 1, wherein the metallic atoms in said conductive network comprises about 10 to 45 atomic % of said atomic scale composite material, and wherein said conductive network of metallic atoms forms emission sites on at least one cathode surface with a density of about 108 $cm^2$ to about 1013 $cm^2$.

15. The cathode of claim 1 wherein the third atomic network of metallic atoms is spatially disposed within said atomic-scale composite material to form at least one conductive metal fiber within said atomic-scale composite material that communicates with the cathode surface to form the at least one nanometer scale emission site.

16. The cathode of claim 15 wherein the third atomic network of metallic atoms is spatially disposed within said atomic-scale composite material to form nonuniform three dimensional conductive fibers within said atomic-scale composite material that communicates with the cathode surface to form the at least one nanometer scale emission site.

17. A cathode having a surface, the cathode comprising an atomic-scale composite material that comprises a first and a second atomic network that penetrate into each other to form a carbon-based stabilized dielectric medium, and a third atomic network of metallic atoms spatially disposed within said atomic-scale composite material to form a conductive network of metallic fibers that communicate with a cathode surface to form at least one nano-meter scale emission site.

18. The cathode of claim 17, wherein the third atomic network of metallic atoms are spatially disposed within said atomic-scale composite material to form a three dimensional conductive network of metallic fibers.

19. An device comprising:

a substrate;

a cathode having at least one surface disposed on the substrate; and an anode disposed on the substrate, wherein the cathode comprises an atomic-scale composite material comprising a first and a the second atomic network that penetrate into each other to form a carbon-based stabilized dielectric medium, and a third atomic network of metallic atoms spatially disposed within said atomic-scale composite material to form a conductive network of metallic atoms that communicate with the surface of the cathode to form at least one emission site thereon.

20. The device of claim 19, wherein the cathode and the anode are disposed on the substrate with a gap there between to form a two terminal structure.

21. The device of claim 19, wherein the anode comprises a phosphorous layer that produces light under electron bombardment.

22. The device of claim 19, wherein the third atomic network of metallic atoms is spatially disposed within said atomic-scale composite material to form at least one conductive metal fiber within said atomic-scale composite material.

* * * * *

UNITED STATES PATENT AND TRADEMARK OFFICE
CERTIFICATE OF CORRECTION

PATENT NO. : 6,891,324 B2
DATED : May 10, 2005
INVENTOR(S) : Dorfman

It is certified that error appears in the above-identified patent and that said Letters Patent is hereby corrected as shown below:

Column 9,
Line 27, replace "networks" with -- network --.
Line 30, add -- the -- between "within" and "dielectric".
Lines 45 and 49, add -- of -- between "cathode" and "claim".
Lines 55 and 60, replace "sites" with -- site --.

Column 11,
Line 1, replace "An" with -- A --.
Line 7, delete "the".

Signed and Sealed this

Eleventh Day of April, 2006

JON W. DUDAS
*Director of the United States Patent and Trademark Office*